United States Patent
Moerbe

(10) Patent No.: US 11,472,412 B2
(45) Date of Patent: Oct. 18, 2022

(54) METHOD FOR ASCERTAINING THE INSTANTANEOUS ROADWAY ROUGHNESS IN A VEHICLE

(71) Applicant: Robert Bosch GmbH, Stuttgart (DE)

(72) Inventor: Matthias Moerbe, Ilsfeld-Helfenberg (DE)

(73) Assignee: Robert Bosch GmbH, Stuttgart (DE)

( * ) Notice: Subject to any disclaimer, the term of this patent is extended or adjusted under 35 U.S.C. 154(b) by 239 days.

(21) Appl. No.: 16/765,859

(22) PCT Filed: Nov. 8, 2018

(86) PCT No.: PCT/EP2018/080703
§ 371 (c)(1),
(2) Date: May 20, 2020

(87) PCT Pub. No.: WO2019/137658
PCT Pub. Date: Jul. 18, 2019

(65) Prior Publication Data
US 2020/0361475 A1    Nov. 19, 2020

(30) Foreign Application Priority Data
Jan. 11, 2018   (DE) .......................... 102018200330.0

(51) Int. Cl.
*B60W 40/068*    (2012.01)
*B60C 23/06*     (2006.01)
*B60G 17/0165*   (2006.01)
*B60T 8/172*     (2006.01)

(52) U.S. Cl.
CPC ......... *B60W 40/068* (2013.01); *B60C 23/065* (2013.01); *B60G 17/0165* (2013.01); *B60T 8/1725* (2013.01); *B60G 2400/208* (2013.01); *B60G 2400/91* (2013.01); *B60G 2800/984* (2013.01); *B60T 2210/14* (2013.01); *B60W 2552/35* (2020.02); *B60W 2552/40* (2020.02)

(58) Field of Classification Search
None
See application file for complete search history.

(56) References Cited

U.S. PATENT DOCUMENTS

| | | | |
|---|---|---|---|
| 6,385,553 B1 | 5/2002 | Naito et al. | |
| 2011/0107828 A1 | 5/2011 | Kawasaki | |

(Continued)

FOREIGN PATENT DOCUMENTS

| | | | |
|---|---|---|---|
| DE | 19537257 A1 | 4/1996 | |
| DE | 19543928 A1 | 5/1997 | |

(Continued)

OTHER PUBLICATIONS

Google Patents machine translation of DE102009012128 A1.*
International Search Report for PCT/EP2018/080703, dated Mar. 19, 2019.

*Primary Examiner* — Lail A Kleinman
(74) *Attorney, Agent, or Firm* — Norton Rose Fulbright US LLP; Gerard Messina

(57) ABSTRACT

A method for ascertaining the instantaneous roadway roughness in a vehicle. In the method, the frequency-dependent amplitude response is determined from the wheel speed, and a roughness characteristic variable is ascertained as a measure of the roadway roughness.

10 Claims, 2 Drawing Sheets

(56) References Cited

U.S. PATENT DOCUMENTS

2015/0284006 A1* 10/2015 Singh .................. B60W 40/068
                                                        702/41
2020/0173908 A1*  6/2020 Masago ................ B60W 40/02
2020/0307327 A1* 10/2020 Karlsson ................ B60C 23/06

FOREIGN PATENT DOCUMENTS

DE         10126315 A1     2/2002
DE      102009012128 A1 *  9/2010  .......... B60W 40/068
DE      102009012128 A1    9/2010

* cited by examiner

METHOD FOR ASCERTAINING THE INSTANTANEOUS ROADWAY ROUGHNESS IN A VEHICLE

FIELD

The present invention relates to a method for ascertaining the instantaneous roadway roughness in a vehicle.

BACKGROUND INFORMATION

The friction coefficient between the tire and the roadway is determined by various influencing variables, which include the design of the tire carcass, the rubber compound, and the surface condition of the roadway. The surface condition, in turn, depends on the moisture condition of the roadway and the micro roughness, which essentially determines the interlocking effect between tires and the roadway. Having knowledge of the roadway roughness, it is possible to generate forces and moments in vehicle units which have an influence on the vehicle dynamics, for example the braking or drive system of the vehicle, in such a way that the driving safety and/or the vehicle dynamics is/are improved.

SUMMARY

Using an example embodiment of a method according to the present invention, it is possible to ascertain, in a vehicle, the instantaneous roughness of the roadway on which the vehicle is driving. The roadway roughness may be determined while the vehicle is driving. The basis for the ascertainment of the roadway roughness is the detection, by sensors, of the rotational speed of a wheel and the analysis of the progression of the wheel speed. The rotational speed of the wheel is preferably determined with the aid of a rotational speed sensor, it also being possible to determine the rotational speed of the wheel from the progression of the rotational speed.

In the method, a frequency-dependent amplitude response is determined on the basis of the recorded rotational speed with the aid of the frequency analysis. The amplitude response represents the frequency-dependent amplitude of the wheel or of the tire, the basic curve of the amplitude response being tire-specific and dependent on the air pressure in the tire and on the tire wear state. The basic curve of the amplitude response has a maximum in the area of a resonance frequency.

The basic curve of the amplitude response is superimposed with a high-frequency oscillation, which is attributable to excitations as a result of the roadway roughness. The high-frequency oscillation in the basic curve of the amplitude response typically has a significantly smaller amplitude than the basic curve. A roughness characteristic variable, which represents a measure of the roadway roughness, is ascertained from this high-frequency oscillation, which represents a deviation from the basic curve of the amplitude response, using statistical methods.

Using the example method according to the present invention, it is thus possible, while driving, to determine a roughness characteristic variable, which denotes the roadway roughness, exclusively based on the pieces of information of a rotational speed sensor. The roughness characteristic variable may subsequently be further processed in the vehicle, in particular for the activation of a vehicle unit which influences the vehicle dynamics, for example the drive system, the braking system and/or the steering system, or an active chassis unit. The roadway roughness essentially determines the interlocking effect between the tire and the road and, together with the moisture condition of the road surface, is one of the main factors of the surface condition of the roadway. Together with the design of the tire and the rubber compound, the surface condition determines the friction coefficient between the tire and the roadway. The roadway roughness thus has a decisive influence on the friction coefficient, the friction coefficient being inferable, if necessary, with knowledge of the roadway roughness, in particular, with additional knowledge of the instantaneous roadway moisture, and with knowledge of the design of the tire carcass and the rubber compound. Since the two latter influencing variables are available for the respective mounted tire type, and the roadway surface moisture may at least be estimated from further pieces of sensor information in the vehicle, the friction coefficient between the tire and the roadway may be ascertained with the aid of the determination of the roadway roughness according to the present invention.

In particular, the amplitude variance of the amplitude response or of the superimposed oscillation is considered as a roughness characteristic variable, which is determined, for example, by a statistical evaluation of the high-frequency oscillation superimposed on the basic curve of the amplitude response. The amplitude variance may be determined from the frequency-dependent amplitude response using conventional mathematical methods. The amplitude variance represents the roughness characteristic variable which accurately reflects the actual roughness of the roadway.

As an alternative to the amplitude variance, which is a measure of the variance in the amplitude response, it is also possible to ascertain and take characteristic variables related to the variance into consideration, for example the standard deviation. In addition or as an alternative, it is furthermore possible to ascertain another statistical roughness characteristic variable, for example the maximum deviation of the high-frequency oscillation from the basic curve of the amplitude response.

According to one advantageous embodiment of the present invention, the roughness characteristic variable is ascertained at the resonance point of the amplitude response of the tire or wheel. The resonance point represents a maximum in the frequency-dependent amplitude response and is characterizing for the utilized tire type, from whose rotational speed the amplitude response is determined. In the area of the resonant amplification, it is possible to determine the roughness characteristic variable from the amplitude response with the highest accuracy. The amplitude response is advantageously considered within a frequency spectrum around the resonance point for the determination of the roadway roughness. In this regard, the roughness characteristic variable is ascertained both directly at the resonance point and in the areas adjoining the resonance point of the amplitude response.

According to one further advantageous embodiment of the present invention, the roughness characteristic variable is related to a tire-typical reference value. The reference to the reference value yields a relative variable, which is valid for the instantaneous tire type. A standardization of the roughness characteristic variable is achieved via the reference to the tire-specific reference value.

According to one further advantageous embodiment of the present invention, the air pressure in the tire is also determined from the progression of the rotational speed. A pressure loss in the tire results in a shift in the curve of the amplitude response toward lower frequencies, it being possible to infer the pressure loss from the extent of the shift.

It is thus possible to determine both the pressure loss in the tire and the roadway roughness from the rotational speed progression.

According to one further advantageous embodiment of the present invention, a rotational speed sensor, with the aid of which the rotational speed of the tire is ascertained, is assigned to each vehicle wheel or at least more than one vehicle wheel. This makes it possible to determine multiple frequency-dependent amplitude responses, and to ascertain a roughness characteristic variable therefrom in each case. As a result of the redundancy achieved hereby, a higher degree of reliability may be achieved in the determination of the roadway roughness.

According to one further advantageous embodiment of the present invention, the ascertained roughness characteristic variable is utilized in the activation of a vehicle unit influencing the vehicle dynamics, such as a braking system, a drive system, a steering system or an active chassis. The activation of the active vehicle unit may take place within the scope of a driver assistance system, if necessary.

The different method steps run in a control unit in the vehicle, to which the pieces of rotational speed information are supplied as input signals and in which a frequency-dependent amplitude response is determined, based on the supplied rotational speed signals, from which the above-described roughness characteristic variable is ascertained. If necessary, control or actuating signals may be generated in the control unit to activate a vehicle unit influencing the vehicle dynamics.

The present invention furthermore relates to a vehicle including at least one rotational speed sensor at a vehicle wheel, at least one vehicle unit influencing the vehicle dynamics, and including an above-described control unit for carrying out the example method.

Further advantages and advantageous embodiments may be derived from the description herein of the figures.

DETAILED DESCRIPTION OF EXAMPLE EMBODIMENTS

Figure 1:
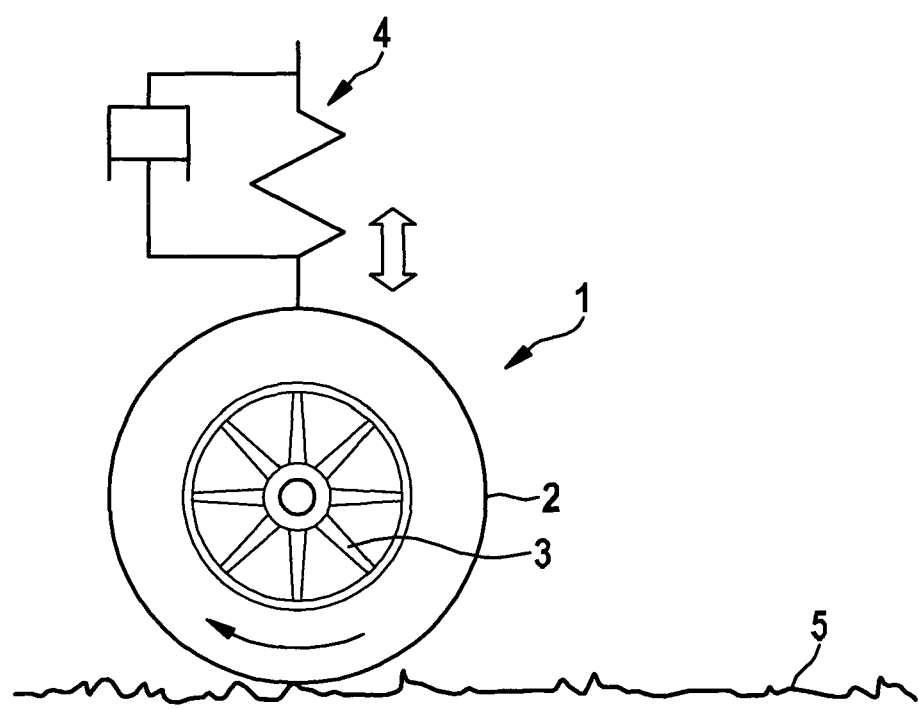
FIG. 1 shows a vehicle wheel on a rough roadway.

FIG. 1 shows a vehicle wheel 1 including a tire 2 on a rim 3, vehicle wheel 1 being suspended at a wheel suspension 4, which is designed as a spring damper system. Vehicle wheel 1 is driving on a roadway 5 which has a comparatively strongly pronounced roadway roughness. The roughness of roadway 5 results in a vertical excitation of vehicle wheel 1 while driving.

Vehicle wheel 1 may be mounted at a motor-operated two-wheeler or at a motor vehicle.

Figure 2:
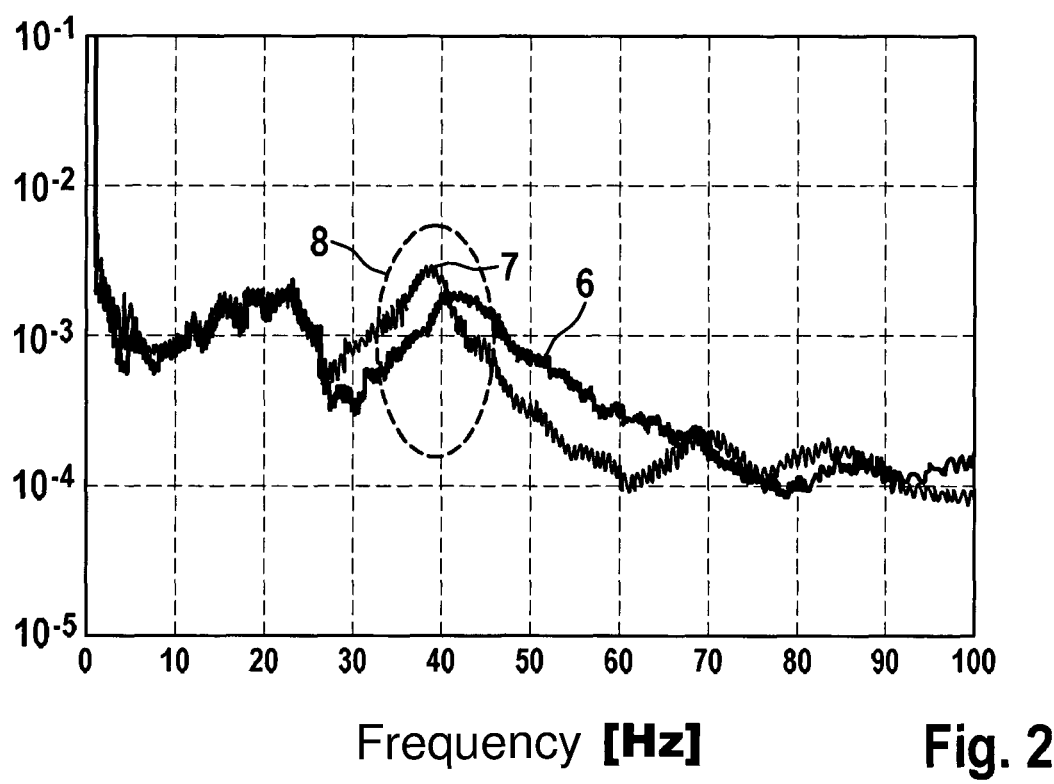
FIG. 2 shows the frequency-dependent amplitude response of the vehicle wheel.

The rotational speed of vehicle wheel 1 is ascertained with the aid of a rotational speed sensor, a frequency-dependent amplitude response shown in FIG. 2 being determinable from the progression of the rotational speed by frequency analysis.

FIG. 2 shows, as a function of the frequency, a setpoint amplitude response 6 and an actual amplitude response 7, which is shifted with respect to setpoint amplitude response 6 in the direction of lower frequencies. The amplitude responses depend on the utilized tire type. The shift between setpoint amplitude response 6 and actual amplitude response 7 is the result of a pressure loss in tire 2.

In FIG. 2, a resonance area 8 is identified by a dotted line, within which the resonance points having a maximum of both setpoint amplitude response 6 and of actual amplitude response 7 are situated. In order to ascertain the roughness characteristic variable, the amplitude variance of actual amplitude response 7 in resonance area 8 is ascertained with the aid of the flow chart according to FIG. 3.

Figure 3:
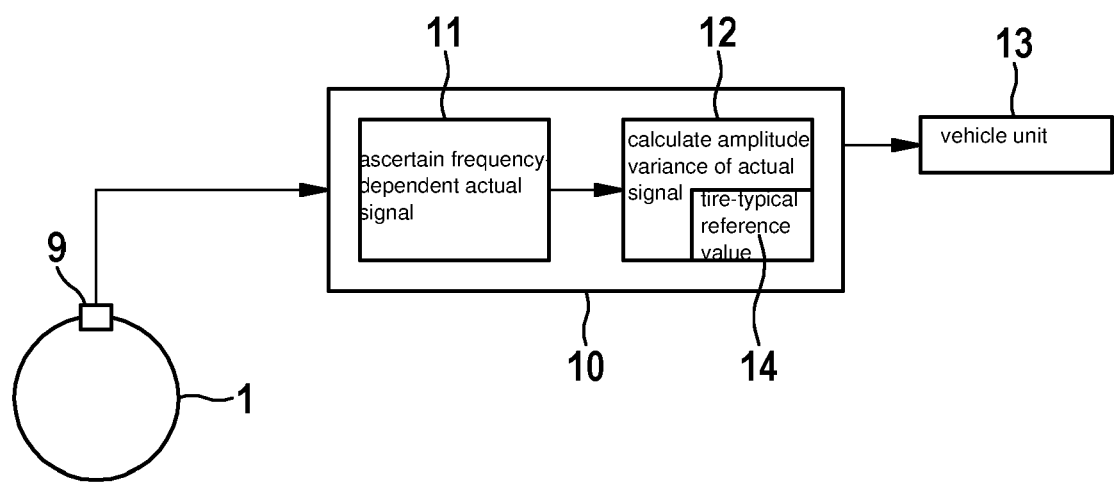
FIG. 3 shows a flow chart for ascertaining the instantaneous roadway roughness in the vehicle.

According to the flow chart in FIG. 3, the wheel speed of vehicle wheel 1 is ascertained with the aid of rotational speed sensor 9 and supplied to a control unit 10 in the vehicle as an input variable, in which the sensor data of rotational speed sensor 9 are evaluated. In control unit 10, the frequency-dependent actual amplitude response is ascertained in a first evaluation step 11 from the rotational speed of rotational speed sensor 9. In resonance area 8 of actual amplitude response 7, the amplitude variance is determined, and in particular, for the high-frequency oscillation which is superimposed on the basic curve of actual amplitude response 7. In FIG. 2, this high-frequency oscillation is apparent as irregular vibration superimposed on the basic curve of the amplitude response.

In a next evaluation step 12, the amplitude variance of actual amplitude response 7 is calculated in resonance area 8 in control unit 10. The amplitude variance represents a roughness characteristic variable, which is related to a tire-typical reference value 14, yielding a standardized roughness characteristic variable which is available at the output of control unit 10 and may be further used in a vehicle unit 13, which has an influence on the vehicle dynamics. Vehicle unit 13 is the braking system, the drive system, the steering system or an active chassis unit, by way of example. The standardized roadway roughness may, in particular, be used with respect to the vehicle safety—or possibly another criterion—during the activation of vehicle unit 13.

What is claimed is:

1. A method of operating a vehicle, the method comprising the following steps:
   obtaining, by a processor of the vehicle, signals from a rotational speed sensor of a wheel of the vehicle;
   identifying, by the processor and in the obtained signals, respective amplitudes for each of a plurality of frequencies of a progression of a rotational speed of the wheel;
   based on differences between different ones of the amplitudes between different ones of the plurality of frequencies, ascertaining, by the processor, a measure of an instantaneous roadway roughness of a roadway on which the vehicle is traveling; and
   modifying, by the processor and based on the ascertained measure of the instantaneous roadway roughness, at least one of a braking of the vehicle on the roadway, a steering of the vehicle on the roadway, and a driving of the vehicle on the roadway.

2. The method as recited in claim 1, further comprising determining, by the processor, an average of squared differences of at least some of the amplitudes from a mean of the at least some of the amplitudes, wherein the ascertainment of the measure of the instantaneous roadway roughness performed based on the determined average of the squared differences.

3. The method as recited in claim 1, further comprising:
   identifying one of the plurality of frequencies at which an amplitude maximum occurs; and
   identifying a value of a predefined characteristic of all amplitudes of those of the plurality of frequencies that are within a predefined frequency band around the identified one of the plurality of frequencies at which the amplitude maximum occurs, wherein the ascertainment of the measure of the instantaneous roadway roughness performed based on the identified value.

4. The method as recited in claim 1, wherein a friction coefficient between a tire of the wheel and the roadway is inferred from the measure of the instantaneous roadway roughness.

5. The method as recited in claim 1, wherein the measure of the instantaneous roadway roughness is compared to a reference value.

6. The method as recited in claim 1, further comprising:
determining, by the processor, an extent and direction of a shift, relative to a baseline curve, of an overall curve of a graph of the amplitudes within a frequency spectrum of the plurality of frequencies; and
determining, by the processor, an air pressure in a tire of the wheel based on the determined extent and direction of the shift.

7. The method as recited in claim 1, wherein a rotational speed sensor, using which the rotational speed of the wheel is ascertained, is assigned to each wheel of the vehicle.

8. A control unit comprising a processor, wherein the processor is configured to operate a vehicle by performing a method, the method comprising:
obtaining, by the processor, signals from a rotational speed sensor of a wheel of the vehicle;
identifying, by the processor and in the obtained signals, respective amplitudes for each of a plurality of frequencies of a progression of a rotational speed of the wheel;
based on differences between different ones of the amplitudes between different ones of the plurality of frequencies, ascertaining, by the processor, a measure of an instantaneous roadway roughness of a roadway on which the vehicle is traveling; and
modifying, by the processor and based on the ascertained measure of the instantaneous roadway roughness, at least one of a braking of the vehicle on the roadway, a steering of the vehicle on the roadway, and a driving of the vehicle on the roadway.

9. A vehicle, comprising:
a wheel;
a rotational speed sensor at the wheel; and
a processor, wherein the processor is configured to operate the vehicle by performing a method, the method comprising:
obtaining, by the processor, signals from the rotational speed sensor;
identifying, by the processor and in the obtained signals, respective amplitudes for each of a plurality of frequencies of a progression of a rotational speed of the wheel;
based on differences between different ones of the amplitudes between different ones of the plurality of frequencies, ascertaining, by the processor, a measure of an instantaneous roadway roughness of a roadway on which the vehicle is traveling; and
modifying, by the processor and based on the ascertained measure of the instantaneous roadway roughness, at least one of a braking of the vehicle on the roadway, a steering of the vehicle on the roadway, and a driving of the vehicle on the roadway.

10. The method as recited in claim 3, wherein the predefined characteristic is a measure of respective differences of the amplitudes of those of the plurality of frequencies that are within the predefined frequency band from a particular value.

* * * * *